3,589,985
ELECTROLYTIC RECORDING PROCESS AND MATERIALS
Eugene F. Barnes, Arlington Heights, Ill., assignor to Stewart-Warner Corporation, Chicago, Ill.
No Drawing. Filed July 3, 1969, Ser. No. 848,378
Int. Cl. B21h 1/20
U.S. Cl. 204—2                                          22 Claims

ABSTRACT OF THE DISCLOSURE

Electrolytic facsimile recording is conducted employing a recording medium including a support such as paper impregnated with an electrolytically conducting solution containing a formaldehyde sulfoxylate reducing agent for depositing dissolved electrochemically oxidized anodic metal on the medium as a marking substance, the said solution also containing lithium hydroxide and preferably an alkali metal stannate, an alkaline buffer, and an alkali metal nitrate.

BACKGROUND OF THE INVENTION

This invention relates to an electrolytic recording process and materials employed therein. More particularly, the invention relates to a process and materials for electrolytic facsimile recording employing a recording medium including a support impregnated with an electrolytically conducting solution containing a formaldehyde sulfoxylate reducing agent for depositing dissolved electrochemically oxidized anodic metal on the medium as a marking substance.

U.S. Pat. No. 3,349,013, granted to the present inventor and Carole N. Urbanski, discloses an electrolytic facsimile recording process of the foregoing character which now is in widespread commercial use, overcoming the problems of prior processes and materials, as described in the patent. While the invention of the patent has proven to be eminently successful, it has been found in practice that room for improvement exists in the character of the image produced on the recording medium. Thus, when employing a silver anode to print in the preferred blue-back color, the image density although high could be improved still further. Also, extended aging of the recording medium as may occur in practice at times results in some lowering of quality with less distinction between shades, evidently owing to reaction of material in the wet strength paper support of the recording medium.

Further, when the preferred alkali metal stannate is employed in the solution for maximum shelf life, there is a tendency for a precipitate to form, and the precipitate must be removed or avoided in compounding, with accompanying loss of materials and/or additional compounding time and labor. Thus, in one method of compounding the solution for impregnating the support, all of the ingredients are mixed together, the solution is allowed to stand, during which time a precipitate forms, and clear solution is decanted from the precipitate with accompanying time and labor requirements and loss of materials. Alternatively, in a procedure which avoids initial precipitation, a master solution may be prepared in advance, omitting the formaldehyde sulfoxylate. When the support is to be impregnated, the sulfoxylate is dissolved in the master solution, after which coating of the support takes place. This procedure requires an additional mixing operation with accompanying time and labor requirements. In addition, a certain amount of precipitate will be found on the recording medium in each case, and while small, the sharpness of the recorded image may be somewhat impaired, with a tendency to feather or blur.

It would be advantageous if the process and materials of the patent could be improved, to achieve denser images, maintain image quality despite reactivity of a wet strength paper support, and obviate precipitation from the preferred solution and the problems occasioned thereby, all without sacrificing any of the advantages provided by the preferred basic process and materials.

SUMMARY OF THE INVENTION

The present invention provides improvements in the electrolytic facsimile recording process, electrolytically conducting solution, and electrolytic recording medium of the aforesaid patent. The invention is based on the discovery that lithium hydroxide when incorporated in the solution functions uniquely to improve print quality and increase manufacturing efficiency and economy without sacrificing the advantages achieved employing the preferred process and materials of the patent.

More particularly, the invention provides an improved electrolytic facsimile recording process employing a recording medium including a support impregnated with an electrolytically conducting solution containing a formaldehyde sulfoxylate reducing agent for depositing dissolved electrochemically oxidized anodic metal on the medium as a marking substance, wherein lithium hydroxide is incorporated in the solution. The invention also provides an improved electrolytically conducting solution containing lithium hydroxide, and an improved electrolytic recording medium including a support or substrate impregnated with such solution, for use in the improved process.

While improvements in the recorded image are achieved in various ways of practicing the present invention, it is most advantageous that an alkali metal stannate be present in the recording medium solution, for maximum stability and long shelf life. Optimum results are achieved by including in the solution an alkaline buffer and an alkali metal nitrate electrolyte, which function as described in the patent.

The advantages of the invention include the achievement of denser, truer blue-black and blue-grays in the recorded image, overcoming the reactivity of wet strength paper and its effect on image quality, and elimination of the manufacturing disadvantages and image feathering or blurring occasioned by the tendency of the preferred stannate-containing solutions to form a precipitate. These advantages are obtained while maintaining the high stability and long shelf life of the materials and minimal erosion of the recorder anode or printer bar hitherto achieved in the preferred practice of the patented invention.

DESCRIPTION OF THE PREFERRED EMBODIMENTS

The recording process, solution, and recording medium of the invention basically are the same as described in the aforementioned patent, with the additional inclusion of lithium hydroxide in the solution. Thus, the solution contains a formaldehyde sulfoxylate which is reactive to reduce metal ions from the anode to free metal, preferably an alkali metal or zinc salt. Presently available formaldehyde sulfoxylates include the sodium and zinc formaldehyde sulfoxylates, and the sodium compound is preferred for producing blue-black prints.

The solution preferably includes an alkaline salt which stabilizes or preserves the reducing agent, particularly an alkali metal stannate, silicate, or aluminate. The alkaline salt stabilizing agent also contributes to the alkalinity desired for the solution. The stannates provide maximum storage stability for the recording medium, the shelf life being at least eight months. Consequently, the stannates are preferred.

An alkaline buffer preferably is included in the solution, to provide additional alkalinity and maintain the desired pH, furnish greater resolution and image density, and minimize anode or printer bar wear. The buffer preferably is an alkaline buffering salt which when dissolved in water provides a pH in the range of about 8–12. The buffers include, for example, soluble alkali metal and alkaline earth metal formates, acetates, carbonates, bicarbonates, borates, phosphates, tartrates and the like. Alkali metal formates, acetates and carbonates are especially preferred.

It is preferred to include a substantially neutral strong electrolyte in the solution, to provide suitable conductivity especially at higher recording currents. The electrolyte preferably is a soluble inorganic salt which does not interfere in the process of production or in the printing process. Alkali metal nitrates, especially potassium and sodium nitrates are preferred. Other nitrates might be employed if desired, such as lithium, cesium, rubidium, and barium nitrates.

A sequestering agent may be included in the solution to obviate any effects of heavy metal ions which may be present as impurities. A preferred agent is ethylenediamine tetraacetic acid tetrasodium salt.

The formaldehyde sulfoxylate reducing agent may be employed in a concentration within a range of about 1–10% by weight of the solution, as disclosed in the above-identified patent. For optimum results including maximum black, it is preferred to employ about 2–6% of the reducing agent, particularly in the case of an alkali metal formaldehyde sulfoxylate.

The pH in the recording medium at the time of printing may be in the range of about 8–12.5, and the solution is compounded so that the preferred minimum pH of 8 is maintained until use. To provide such pH after a period of storage, it is preferred that the solution for impregnating the support have a pH of about 10.5–13. The pH drops following impregnation of the support and during storage.

Lithium hydroxide is incorporated in the solution in a proportion of at least about 0.5% by weight of the solution, for achieving significant benefits according to the invention, and the preferred range of proportions is about 0.05–1% by weight. In the absence of the alkaline salt stabilizing agent, it is preferred to employ about 0.5–1% of lithium hydroxide to provide the desired alkalinity in the solution. When employing the alkaline salt stabilizing agent, which contributes to the alkalinity, it is preferred to employ about 0.05–0.75% of the lithium hydroxide in the solution.

In general, an alkaline salt stabilizing agent may be employed in a proportion of about 0.25–3% by weight of the solution. Optimum results are achieved by employing an alkali metal stannate in a proportion of about 1–2%.

Inasmuch as lithium hydroxide and the alkaline salt stabilizing agent both contribute to the alkalinity of the solution, their proportions in general vary inversely with respect to each other. Thus, a maximum of about 0.5% of lithium hydroxide is employed with 1.5% or greater of alkali metal stannate. Up to about 0.75% of lithium hydroxide may be employed with 1% of alkali metal stannate.

The alkaline buffer preferably is employed in a concentration in the range of about 0.25–5%, more preferably, 0.5–2% by weight of the solution. The concentration may vary, depending upon the specific buffer employed and the remaining ingredients of the composition.

The alkali metal nitrate electrolyte preferably is employed in a concentration within the range of about 5–20%, more preferably 7–15% by weight of the solution. About 0.1–0.3% by weight of the sequestering agent may be employed, and water may constitute the balance of the solution.

The solution is compounded in a preferred manner commencing with water at about 100° F. The ingredients are admixed in the following order: alkaline salt stabilizing agent, alkaline buffer, lithium hydroxide, sequestering agent, alkali metal nitrate, and formaldehyde sulfoxylate reducing agent. The temperature is about 80° F. by the end of the addition. The solution is clear and may be employed for impregnating the support at any time after compounding, with no precipitate formation.

In providing the electrolytic recording medium, the solution preferably is applied to commercial wet strength paper as the support. Alkaline wet strength paper has been found to be preferable for insuring long term storage stability. The preferred paper is described in Example 1 of the above-identified patent, and it contains as the wet strength agent one-half percent by weight based on the paper of a cationic water soluble polymer produced by cross-linking an essentially linear polyamide from saturated aliphatic dicarboxylic acid and polyalkylenepolyamine with epichlorohydrin and having a molecular weight in the range of about 2,000–5,000 (Kymene 557).

The alkaline wet strength paper tends to lower the pH of the recording medium, especially when excess wet strength agent is found on the paper as occurs from time to time in commercial manufacture. The lithium hydroxide counteracts the action of the alkaline paper, maintaining the proper alkalinity and insuring excellent image density and shade separation whether or not excessive wet strength agent is present.

The solution may be applied to the paper or other support in any suitable conventional manner, such as by immersion or roller coating followed by removal of excess material. The quantity of solution remaining on the sheet preferably constitutes about 60–110% of the weight of the sheet on wet strength papers. The product recording medium may be packaged on opaque polyethylene bags or the like, which are heat sealed and placed in cartons or containers and stored at a preferred temperature of about 65–75° F., for maximum shelf life.

The recording medium is well-suited for use on commercial recording equipment, of the type and in the manner described in the above-identified patent, at any printing speed up to 900 drum revolutions or lines per minute. Silver is the preferred anodic metal employed in the printer bar or the like, although other metals may be employed, as also described in the patent. Silver produces the desired dark blue-black image.

An important advantage of the use of lithium hydroxide is that the printer bar is not eroded, whereas sodium and potassium hydroxide are very reactive and rapidly erode the bar. The silver dissolved in this manner is present on the recording medium and may produce a bronze coloration. Also, the storage stability of the recording medium with sodium or potassium hydroxide present in the solution is lower than with lithium hydroxide when employing an alkaline salt stabilizing agent. Without the stabilizing agent, the shelf life employing sodium or potassium hydroxide is about two days as compared to several months employing lithium hydroxide.

The following composition represents a preferred embodiment of an improved electrolytically conducting solution for incorporation in a recording medium according to the invention, it being understood that the invention is not limited to the materials and proportions employed therein, to the method of compounding the composition, or to the procedures and conditions of use described thereafter, which are merely illustrative

| Material: | Proportion, percent by weight |
|---|---|
| Water | 78.0 |
| Potassium or sodium stannate trihydrate | 1.5 |
| Potassium or sodium acetate | 1.3 |
| Lithium hydroxide monohydrate | 0.1 |
| Ethylenediamine tetraacetic acid, tetrasodium salt dihydrate | 0.1 |
| Sodium or potassium nitrate | 15.0 |
| Sodium formaldehyde sulfoxylate dihydrate | 4.0 |

The composition preferably is compounded by mixing the materials in the order listed, commencing with the water at about 100° F. depending on the quality of the materials, especially the stannate and the lithium hydroxide. No precipitate forms initially or upon standing, and the solution may be used in its entirety at any time thereafter. The composition may be stored in a dark bottle or other container which protects the composition from light, at a preferred temperature of about 65–75° F.

The composition may be impregnated in commercial alkaline wet strength paper of the type and in the manner described in Example 1 of U.S. Pat. No. 3,349,013, wherein the wet strength agent is Kymene 557 as identified above. It is preferred to impregnate the paper with the solution in a solution:paper weight ratio of about 1:1, with the proportion of solution varying in practice as much as about 10%, over or under. At this time, the pH in the medium is about 9.5–10, by visual indicator. Impregnated paper in rolls is sealed in opaque polyethylene bags and stored at 65–75° F. The impregnated paper is stable for at least eight months.

The impregnated paper may be employed in conventional drum and helix recorders employing silver alloy printer bars of the type and under the conditions described in Example 1 of the aforementioned patent. The diffuse reflectance optical density for the mark as read on a Macbeth Quantalog Densitometer, Model RD–100, was 1.30–1.31 at 100 r.p.m., as compared to 1.25–1.27 for the prior recording medium in the absence of lithium hydroxide. In this connection, further increase in the image density, to 1.35, may be achieved with lithium hydroxide in the solution in the absence of stannate, but with attendant sacrifice of shelf life, i.e., the shelf life then is on the order of several months.

It is found that despite variations in the concentration of the wet strength agent on the paper, which occur routinely there is no loss of image density or decrease in shade separation as otherwise occur with excess wet strength agent. The image is sharp, without feathering or blurring, owing to lack of precipitate on the recording medium. The prints also appear glossier to the eye than in the absence of lithium hydroxide. No acceleration of printer bar erosion is observed.

While the proportions of the materials may be varied, as described hereinabove, there appears to be no advantage in so doing, and optimum results are achieved with the specific composition. For example, when the proportion of lithium hydroxide in the composition is increased to 0.35% by weight, reducing the acetate buffer to 1.05%, the results are about the same except that the prints show higher contrast with less shade separation.

The invention thus provides an improved electrolytic recording process and materials employed therein which provide the advantages of the basic process and materials as described in U.S. Pat. No. 3,349,013, and, in addition, produce even higher image densities, overcome the problem of excess wet strength agent in recording paper, and eliminate problems occasioned by precipitation including feathering, while providing the desired long shelf life and maintaining minimal printer bar erosion. The new solution may be prepared and applied to a support with a minimum number of operations, simply, rapidly, reliably and economically.

While illustrative preferred embodiments of the invention have been described, it will be apparent to those skilled in the art that various changes and modifications may be made in the process and materials of the invention within its spirit and scope. It is intended that such changes and modifications be included within the scope of the appended claims.

I claim:

1. In an electrolytic facsimile recording process employing a recording medium including a support impregnated with an electrolytically conducting solution containing a formaldehyde sulfoxylate reducing agent for depositing dissolved electrochemically oxidized anodic metal on the medium as a marking substance, the improvement which comprises incorporating at least about 0.05% by weight of lithium hydroxide in said solution.

2. A process as defined in claim 1 wherein said anodic metal is silver.

3. A process as defined in claim 2 wherein about 0.05–1% by weight of lithium hydroxide is incorporated in said solution.

4. A process as defined in claim 2 wherein about 0.05–0.75% by weight of lithium hydroxide and about 1–2% by weight of an alkali metal stannate are incorporated in said solution, said lithium hydroxide and alkali metal stannate proportions generally varying inversely with respect to each other.

5. A process as defined in claim 3 wherein the pH of said solution is about 10.5–13.

6. A process as defined in claim 4 wherein the pH of said solution is about 10.5–13.

7. In an electrolytic facsimile recording process employing a recording medium including a support impregnated with an electrolytically conducting solution containing a formaldehyde sulfoxylate reducing agent for depositing dissolved electrochemically oxidized anodic silver metal on the medium as a marking substance, the improvement which comprises employing as the recording medium a paper support impregnated with an electrolytically conducting solution containing, in proportions by weight, about 2–6% of an alkali metal formaldehyde sulfoxylate, about 0.05–0.75% of lithium hydroxide, about 1–2% of an alkali metal stannate, an alkaline buffer, and an alkali metal nitrate, said lithium hydroxide and alkali metal stannate proportions generally varying inversely with respect to each other, and the pH of said solution being about 10.5–13.

8. An improved electrolytically conducting solution containing a formaldehyde sulfoxylate reducing agent for incorporation in a recording medium and use in an electrolytic fasimile recording process in which the reducing agent acts to deposit dissolved electrochemically oxidized anodic metal on the medium as a marking substance, wherein at least about 0.05% by weight of lithium hydroxide is incorporated in said solution.

9. A solution as defined in claim 8 containing about 0.05–1% by weight of lithium hydroxide.

10. A solution as defined in claim 8 containing about 0.05–0.75% by weight of lithium hydroxide and about 1–2% by weight of an alkali metal stannate, said lithium hydroxide and alkali metal stannate proportions generally varying inversely with respect to each other.

11. A solution as defined in claim 9 having a pH of about 10.5–13.

12. A solution as defined in claim 10 having a pH of about 10.5–13.

13. An improved electrolytically conducting solution containing a formaldehyde sulfoxylate reducing agent for incorporation in a recording medium and use in an electrolytic facsimile recording process in which the reducing agent acts to deposit dissolved electrochemically oxidized anodic metal on the medium as a marking substance, wherein said solution contains, in proportions by weight, about 2–6% of an alkali metal formaldehyde sulfoxylate, about 0.05–0.75% of lithium hydroxide, about 1–2% of an alkali metal stannate, an alkaline buffer, and an alkali metal nitrate, said lithium hydroxide and alkali metal stannate proportions generally varying inversely with respect to each other, and the pH of said solution being about 10.5–13.

14. A solution as defined in claim 13 containing, in proportions by weight, about 0.5–2% of said alkaline buffer and about 7–15% of said alkali metal nitrate.

15. An improved electrolytic recording medium including a support impregnated with an electrolytically conducting solution containing a formaldehyde sulfoxylate reducing agent for use in an electrolytic facsimile recording process in which the reducing agent acts to deposit dissolved electrochemically oxidized anodic metal on the medium as a marking substance, wherein at least about 0.05% by weight of lithium hydroxide is incorporated in said solution.

16. A recording medium as defined in claim 15 wherein said solution contains about 0.05–1% by weight of lithium hydroxide.

17. A recording medium as defined in claim 16 wherein the pH of said solution is about 10.5–13.

18. A recording medium as defined in claim 17 wherein said support comprises alkaline wet strength paper.

19. A recording medium as defined in claim 15 wherein said solution contains about 0.05–0.75% by weight of lithium hydroxide and about 1–2% by weight of an alkali metal stannate, said lithium hydroxide and alkali metal stannate proportions generally varying inversely with respect to each other.

20. A recording medium as defined in claim 19 wherein the pH of said solution is about 10.5–13.

21. A recording medium as defined in claim 20 wherein said support comprises alkaline wet strength paper.

22. An improved electrolytic recording medium including alkaline wet strength paper impregnated with an electrolytically conducting solution containing a formaldehyde sulfoxylate reducing agent for use in an electrolytic facsimile recording process in which the reducing agent acts to deposit dissolved electrochemically oxidized anodic metal on the medium as a marking substance, wherein said solution contains, in proportions by weight, about 2–6% of an alkali metal formaldehyde sulfoxylate, about 0.05–0.75% of lithium hydroxide, about 1–2% of an alkali metal stannate, an alkaline buffer, and an alkali metal nitrate, said lithium hydroxide and alkali metal stannate proportions generally varying inversely with respect to each other, and the pH of said solution being about 10.5–13.

References Cited
UNITED STATES PATENTS

| | | | |
|---|---|---|---|
| 3,113,910 | 12/1963 | Hepher | 204—2 |
| 3,332,857 | 7/1967 | Lieblich | 204—2 |
| 3,349,013 | 10/1967 | Barnes et al. | 204—2 |

JOHN H. MACK, Primary Examiner

T. TUFARIELLO, Assistant Examiner